(12) United States Patent
Sahlstorfer

(10) Patent No.: US 8,196,937 B2
(45) Date of Patent: Jun. 12, 2012

(54) TRANSPORT WHEEL FOR A HELICOPTER

(75) Inventor: Hermann Sahlstorfer, Altperlach/Muenchen (DE)

(73) Assignee: Eurocopter Deutschland GmbH, Donauwoerth (DE)

(*) Notice: Subject to any disclaimer, the term of this patent is extended or adjusted under 35 U.S.C. 154(b) by 799 days.

(21) Appl. No.: 12/259,069

(22) Filed: Oct. 27, 2008

(65) Prior Publication Data
US 2009/0108551 A1 Apr. 30, 2009

(30) Foreign Application Priority Data
Oct. 26, 2007 (DE) .......................... 10 2007 051 650

(51) Int. Cl.
*B64C 25/66* (2006.01)
(52) U.S. Cl. .................... 280/9; 280/767; 244/103 R
(58) Field of Classification Search .................. 280/8, 9, 280/10, 11, 7.12, 767; 244/17.17, 103 R
See application file for complete search history.

(56) References Cited

U.S. PATENT DOCUMENTS

| | | | |
|---|---|---|---|
| 3,279,722 A | 10/1966 | Glover, Jr. et al. | |
| 4,600,168 A | 7/1986 | Selecman | |
| 4,603,869 A | 8/1986 | Maxwell | |

FOREIGN PATENT DOCUMENTS

| | | |
|---|---|---|
| GB | 2042990 A | 10/1980 |
| JP | 2009006958 A | 1/2009 |

*Primary Examiner* — Jeffrey J Restifo
(74) *Attorney, Agent, or Firm* — Brooks Kushman P.C.

(57) ABSTRACT

A transport wheel device for a helicopter having a runner defining an axial direction. The transport wheel includes a holding frame, a wheel axle, a slide, a wheel and a lifting device. The holding frame is detachably securable to the runner. The wheel axle is attached the holding frame by the slide. The slide is continuously adjustable axially with respect to the holding frame and securable in an axial position. A wheel is disposed on the wheel axle. The lifting device is coupled to the holding frame and the wheel axle. The lifting device is configured to vertically move the transport wheel.

14 Claims, 4 Drawing Sheets

TRANSPORT WHEEL FOR A HELICOPTER

CROSS REFERENCE TO RELATED APPLICATIONS

Priority is claimed to German Patent Application No. DE 10 2007 051 650.0, filed Oct. 26, 2007, the entire disclosure of which is incorporated by reference herein.

FIELD

The invention relates to a transport wheel for a helicopter.

BACKGROUND

Helicopters usually include a slide which, in order to have control over the physical effects that are peculiar to the helicopter, consists of runners and flexible tubes with a defined spring characteristic used as a landing gear. This landing gear fulfils most conditions of application of a helicopter, yet has great disadvantages in the event of movement of the helicopter on the ground.

In order to render possible movement or displacement of the helicopter on the ground, the runners of the helicopter, which are aligned in parallel to each other, may each include a respective transport wheel which is capable of being jacked up. In order to prevent the helicopter from tipping or to minimize the forces for the operating personnel, the assembly of the two transport wheels should as far as possible be effected in such a way that, when viewed in the axial direction or in the longitudinal direction of the helicopter, the position of the overall centre of gravity of the helicopter lies on or in the immediate vicinity of an imaginary connecting line of the two transport wheels.

Such transport wheels for a helicopter are used in Eurocopter EC 135 helicopter, for example.

The position of the overall centre of gravity of a helicopter, depending on various load states of the helicopter, such as, for example, refuelling, additional loading etc., is not constant.

The known transport wheels prove to be disadvantageous since they do not enable there to be sufficient adjustment to the respective position of the centre of gravity of the helicopter. The consequence of this is that the overall centre of gravity of the helicopter does not always lie above the imaginary connecting line of the transport wheels, that is, significant moments or operating forces result. In order to compensate for these moments or forces it is necessary to use trim weights.

SUMMARY

An aspect of the present invention is to form a transport wheel for a helicopter further in such a way that adjustment of the transport wheels to the respective position of the centre of gravity of the helicopter is rendered possible.

In an embodiment, the present invention provides a transport wheel device for a helicopter having a runner defining an axial direction. The transport wheel includes a holding frame, a wheel axle, a slide, a wheel and a lifting device. The holding frame is detachably securable to the runner. The wheel axle is attached the holding frame by the slide. The slide is continuously adjustable axially with respect to the holding frame and securable in an axial position. A wheel is disposed on the wheel axle. The lifting device is coupled to the holding frame and the wheel axle. The lifting device is configured to vertically move the transport wheel.

BRIEF DESCRIPTION OF THE DRAWINGS

Exemplary embodiments of the present invention are described in further detail below in connection with the drawings, in which.

DETAILED DESCRIPTION

Figure 1:
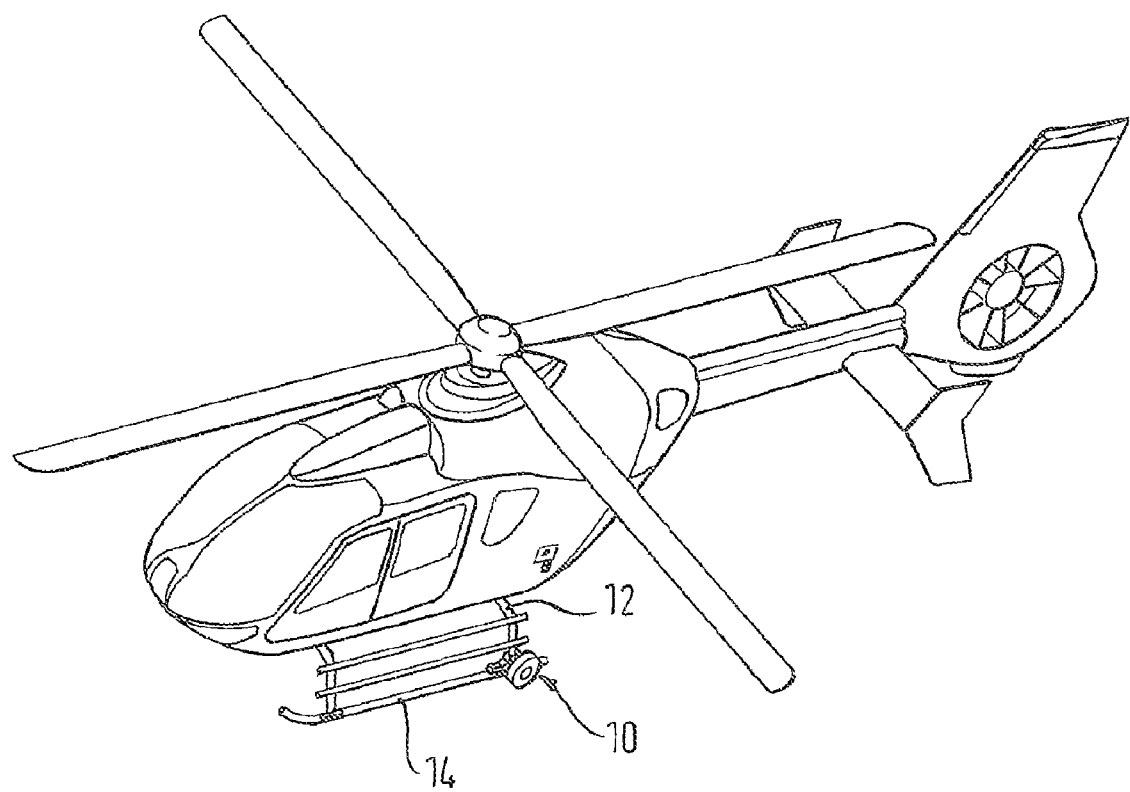
FIG. 1 shows a perspective representation of a helicopter obliquely from the front with a transport wheel in accordance with the invention that is assembled in the region of the flexible tube on the runner.

In an embodiment of the present invention, the transport wheel for a helicopter comprises a holding frame which can be detachably secured to a runner of the helicopter, a wheel axle that bears a wheel and is operatively connected to the holding frame, and also a lifting device that is operatively connected to the holding frame and the wheel axle for vertically moving or jacking up the transport wheel. The wheel axle bearing the wheel is operatively connected to the holding frame by way of a slide, with the slide, when viewed in the axial direction or in the longitudinal direction of the helicopter, being formed so that it is continuously adjustable in relation to the holding frame and so that it can be arrested in its respective axial position.

As a result of the features in accordance with the invention the transport wheels can be adapted to the position of the overall centre of gravity of the helicopter, that is, to align the transport wheels in the axial direction in such a way that the centre of gravity of the helicopter always comes to lie above the imaginary connecting line of the transport wheels. The necessary operating forces for the operating personnel on the ground are thus reduced and use of trim weights is no longer required.

The slide, when viewed in the radial direction, may be guided in the holding frame in a form-locking manner. The form-locking guidance can be produced simply and inexpensively and moreover it guarantees seating of the slide in the holding frame in a secure manner to prevent loss.

The slide can be operatively connected to a lever that is easily accessible. The lever has the effect that simple handling, that is, displacement of the slide, is rendered possible.

In order to simplify the handling further, in an embodiment the lever also has the appropriate means for the axial arrest of the slide in relation to the holding frame.

The lifting device and the wheel axle bearing the wheel can be detachably secured to the holding frame. This has the effect that both the lifting device and the wheel can be quickly disassembled and can be carried along in the cabin of the helicopter, for example.

In order to reduce or minimize the bending moments acting on the transport wheel, in accordance with an embodiment of the invention the holding frame is arranged in the region of the flexible tube.

For this, the holding frame may be formed in two sections. That is to say, the holding frame has two holding legs that are arranged in parallel to each other and in the assembled state the flexible tube is arranged in the intermediate space set by the two holding legs. The holding frame is detachably secured to the runner and the flexible tube by way of first and second end regions of the holding legs. The arrangement that is in two sections and receives the flexible tube between the two holding legs prevents unintentional axial displacement of the holding frame.

In accordance with an embodiment, the first end regions of the holding legs are in each case formed as semicircular recesses that embrace the runner partly in a form-locking manner, and the second end regions of the holding legs in each case have a bore to receive a securing element that extends behind the flexible tube and is mounted on the two holding legs in a secure manner to prevent loss. This has the effect that simple assembly of the holding frame is guaranteed.

The securing element can be formed in two parts and comprises a clip that is formed in a substantially U-shaped manner with ends that are formed in a jaw-shaped manner and a separate bolt that extends behind the flexible tube and is guided in the jaw-shaped ends. The development proves to be particularly advantageous, since the bolt is held in a secure manner to prevent loss in a simple way by way of a rotational movement of the clip, which is formed in a U-shaped manner, on account of the ends that are formed in a jaw-shaped manner.

In accordance with a further embodiment of the invention, the holding frame and/or the slide are formed as cast portions. The formation of the holding frame and/or the slide as cast portions renders possible inexpensive production.

In FIG. 1 a helicopter is shown in a view obliquely from the front in a more or less diagrammatic representation.

A transport wheel that is denoted as a whole by the reference numeral 10 is secured to a runner 14 of the helicopter in the region of a flexible tube 12. A corresponding transport wheel is assembled on the opposite runner of the helicopter.

Figure 2:
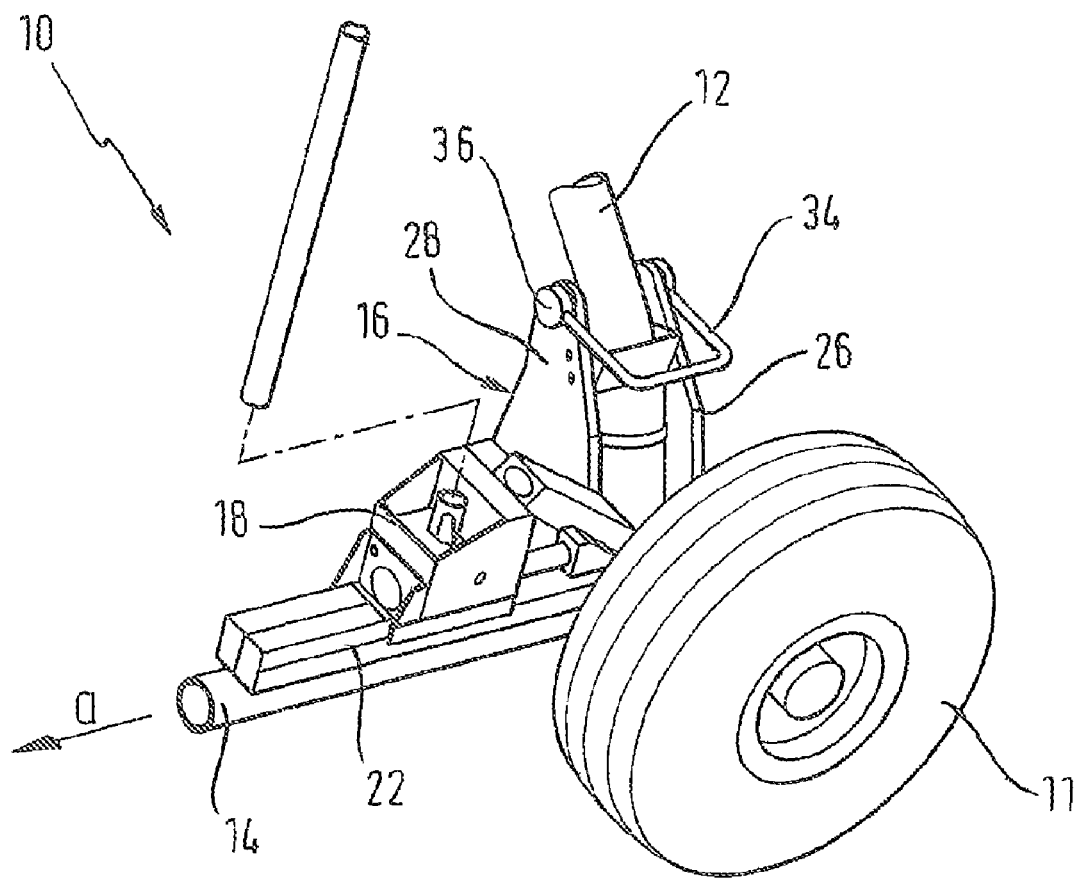
FIG. 2 shows the transport wheel from FIG. 1 in an enlarged representation.

The transport wheel 10 that is represented comprises a wheel 11, a holding frame 16, and also a lifting device 18 for vertical movement, that is, for jacking up the transport wheel 10, as shown in FIG. 2.

Figure 3:
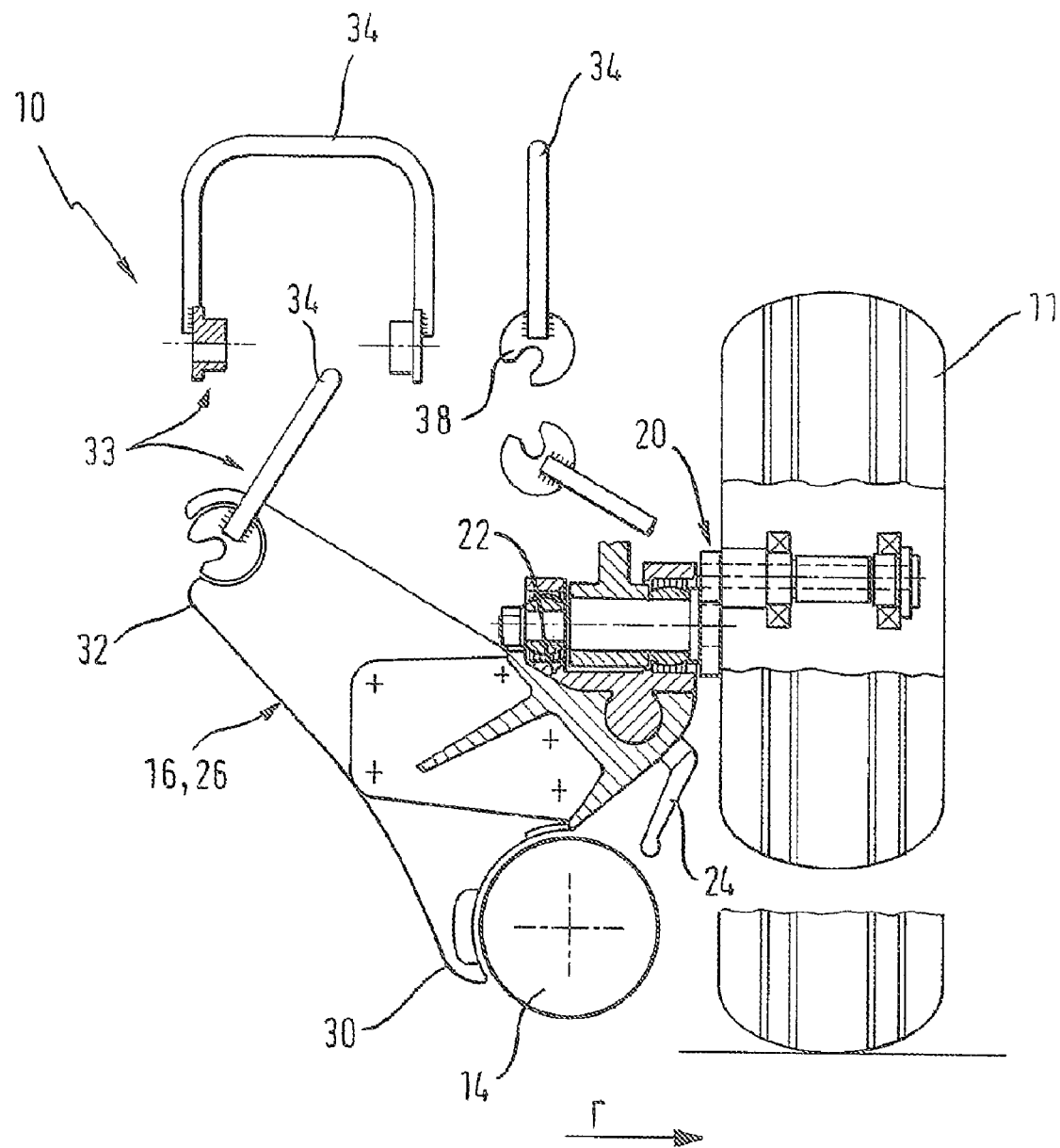
FIG. 3 shows the transport wheel from FIG. 2 in a sectional representation.

As can be inferred in particular from FIG. 3, a wheel axle 20 bearing the wheel 11 is operatively connected to the holding frame 16 by way of a slide 22.

The slide 22 is then guided in a form-locking manner in the holding frame 16 by way of a section that is formed in a spherical manner in cross section, when viewed in the radial direction r. The form-locking guidance is then designed in such a way that, when viewed in the axial direction a, the slide 22 can be continuously adjusted and arrested in relation to the holding frame 16.

As a result of the continuous axial adjustability of the slide 22, simple adaptation of the transport wheels 10 to the respective position of the overall centre of gravity of the helicopter is rendered possible in the present case. The hitherto usual trim weights for compensation of the overall centre of gravity that has "migrated" on account of refuelling or additional loading, for example, are no longer required.

As FIG. 3 further shows, the slide 22 is, moreover, operatively connected to a lever 24. The lever 24 is then arranged in such a way that it is easily accessible for the operating personnel and is used as a point of engagement for displacement of the slide 22 and thus the wheel 11 in relation to the holding frame 16. Moreover, the lever 24 has means to arrest the slide 22 in order to fix a selected axial position of the transport wheel 10. A representation of the means for arresting the slide 22 has been dispensed with in the present case for reasons of clarity.

As already stated, the transport wheel or wheels 10 are arranged in the region of the flexible tube 12 in the present case, as shown in FIGS. 1 and 2.

In order to render possible non-slip assembly of the transport wheel 10, when viewed in the axial direction a, the holding frame 16 is formed in two sections, having a first and second holding leg 26, 28, as shown FIG. 2. The holding legs 26, 28 are aligned in parallel to each other, and in the assembled state the flexible tube 12 is arranged in the interspace between the two holding legs 26, 28.

For simple assembly of the two holding legs 26, 28 and thus of the holding frame 16 on the runner 14 or on the flexible tube 12, the two holding legs 26, 28 each have first end regions 30 associated with the runner 14 and second end regions 32 associated with the flexible tube 12.

Whilst in the present case the first end regions 30 of the holding legs 26, 28 are formed as semicircular recesses that embrace the runner 14 partly in a form-locking manner, the second end regions 32 of the holding legs 26, 28 each comprise a bore to receive a securing element 33 that extends behind the flexible tube 12 and is mounted on the two holding legs 26, 28 in a secure manner to prevent loss.

In the present case, the securing element 33 is formed in two parts and comprises a clip 34 formed in a U-shaped manner and a separate bolt 36 that extends behind the flexible tube 12. The clip 34 has ends 38 that are formed in a jaw-shaped manner to receive the bolt 36 so that by way of a simple rotational movement of the clip 34 the bolt 36 that is arranged behind the flexible tube 12 can be fixed with the clip 34, and mounting of the bolt 36 in a secure manner to prevent loss is guaranteed.

Figure 4:
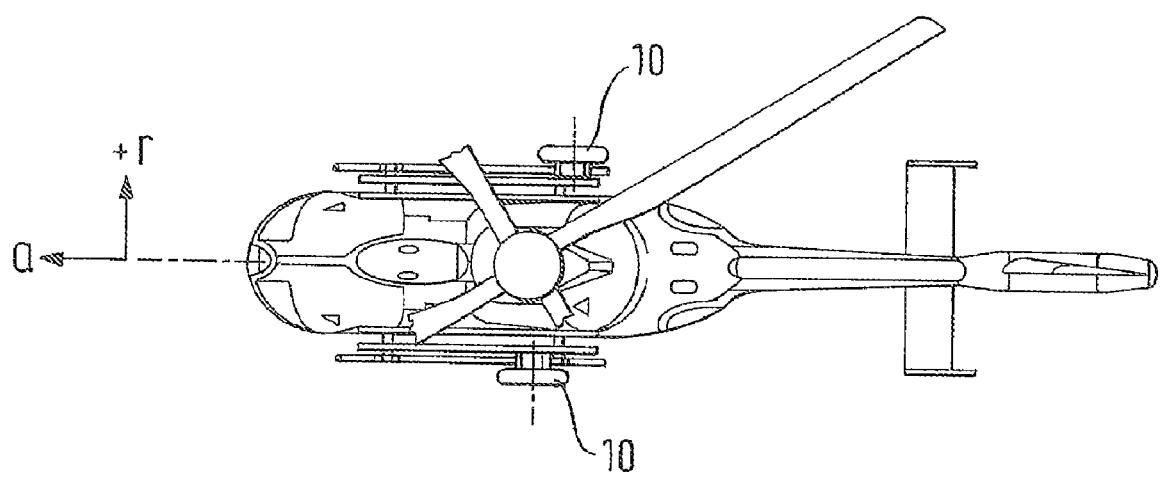
FIG. 4 shows a top view of the helicopter with transport wheels that are arranged so that they are offset with respect to each other.

FIG. 4 shows an alternative arrangement of the two transport wheels 10. The two transport wheels 10 are in this case arranged so that they are offset with respect to each other when viewed from above. The offset arrangement is then selected so that, when viewed in the axial direction a, the overall centre of gravity of the helicopter lies between the two transport wheels 10. The advantage of this special arrangement of the two transport wheels 10 is that the tendency of the helicopter to tilt is minimized and thus the helicopter can be "held" by one operator.

The offset arrangement can be combined with a suitable pulling device so that the helicopter can be pulled without an accompanying person.

LIST OF REFERENCE SYMBOLS

10 Transport wheel
11 Wheel
12 Flexible tube
14 Runner
16 Holding frame
18 Lifting device
20 Wheel axle
22 Slide
24 Lever
26 First holding leg
28 Second holding leg
30 First end region
32 Second end region
33 Securing element
34 Clip
36 Bolt
38 Jaw-shaped ends
a axial direction
r radial direction

What is claimed is:

1. A transport wheel device for a helicopter having a runner defining an axial direction and a wheel secured to the runner, the transport wheel device comprising:

a holding frame detachably securable to the runner;
a slide, the slide being continuously adjustable axially with respect to the holding frame and securable in an axial position;
a wheel axle attached to the holding frame by the slide;
the wheel disposed on the wheel axle; and
a lifting device coupled to the holding frame and the wheel axle, the lifting device being configured to vertically move the transport wheel, wherein the holding frame is configured so as to be securable to the runner in a region of a flexible tube, and the holding frame includes two sections including parallel holding legs configured to receive the flexible tube therebetween, each holding leg including first and second end regions configured to be respectively detachably secured to the runner and flexible tube.

2. The transport wheel device as recited in claim 1, wherein the slide is guided in a form-locking manner with respect to a radial direction of the runner.

3. The transport wheel device as recited in claim 2, further comprising a lever coupled to the slide.

4. The transport wheel device as recited in claim 3, wherein the lever includes a device configured to secure the slide with respect to the holding frame in the axial position.

5. The transport wheel device as recited in claim 1, further comprising a lever coupled to the slide.

6. The transport wheel device as recited in claim 5, wherein the lever includes a device configured to secure the slide with respect to the holding frame in the axial position.

7. The transport wheel device as recited in claim 1, wherein the lifting device, the wheel axle and the wheel are detachably securable to the holding frame.

8. The transport wheel device as recited in claim 1, wherein the first end region of each holding leg includes a semicircular recess configured to receive the runner in a form-locking manner, and
wherein the second end region of each holding leg includes a bore configured to receive a securing element behind the flexible tube, the securing element being securely mounted on the two holding legs.

9. The transport wheel device as recited in claim 8, wherein the securing element includes a U-shaped clip with jaw shaped ends and a bolt configured to be disposed behind the flexible tube and swivelably held in the jaw shaped ends of the U-shaped clip.

10. The transport wheel device as recited in claim 1, wherein at least one of the holding frame and slide is a cast piece.

11. A transport wheel device for a helicopter having a runner defining an axial direction, the transport wheel device comprising:
a holding frame detachably securable to the runner;
a slide, the slide being continuously adjustable axially with respect to the holding frame and securable in an axial position;
a wheel axle attached to the holding frame by the slide;
a wheel disposed on the wheel axle;
a lifting device coupled to the holding frame and the wheel axle, the lifting device being configured to vertically move the transport wheel;
wherein the holding frame is configured so as to be securable to the runner in a region of a flexible tube; and
wherein the holding frame includes two sections including parallel holding legs configured to receive the flexible tube therebetween, each holding leg including first and second end regions configured to be respectively detachably secured to the runner and flexible tube.

12. The transport wheel device as recited in claim 11, wherein the first end region of each holding leg includes a semicircular recess configured to receive the runner in a form-locking manner, and
wherein the second end region of each holding leg includes a bore configured to receive a securing element behind the flexible tube, the securing element being securely mounted on the two holding legs.

13. A transport wheel device for a helicopter having a runner defining an axial direction, the transport wheel device comprising:
a holding frame detachably securable to the runner;
a slide, the slide being continuously adjustable axially with respect to the holding frame and securable in an axial position;
a wheel axle attached to the holding frame by the slide;
a wheel disposed on the wheel axle;
a lifting device coupled to the holding frame and the wheel axle, the lifting device being configured to vertically move the transport wheel;
a lever coupled to the slide;
the lever including a device configured to secure the slide with respect to the holding frame in the axial position;
the holding frame being configured so as to be securable to the runner in a region of a flexible tube; and
wherein the holding frame includes two sections including parallel holding legs configured to receive the flexible tube therebetween, each holding leg including first and second end regions configured to be respectively detachably secured to the runner and flexible tube.

14. The transport wheel device as recited in claim 13, wherein the first end region of each holding leg includes a semicircular recess configured to receive the runner in a form-locking manner, and wherein the second end region of each holding leg includes a bore configured to receive a securing element behind the flexible tube, the securing element being securely mounted on the two holding legs.

* * * * *